(12) United States Patent
Benthien et al.

(10) Patent No.: US 12,358,625 B2
(45) Date of Patent: Jul. 15, 2025

(54) COMPARTMENT SYSTEM FOR A CABIN OF A VEHICLE

(71) Applicant: Airbus Operations GmbH, Hamburg (DE)

(72) Inventors: Hermann Benthien, Hamburg (DE); Florian Müller, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 163 days.

(21) Appl. No.: 18/165,962

(22) Filed: Feb. 8, 2023

(65) Prior Publication Data
US 2023/0249828 A1    Aug. 10, 2023

(30) Foreign Application Priority Data

Feb. 10, 2022   (EP) .................................. 22156038.6

(51) Int. Cl.
    B64D 11/00      (2006.01)
(52) U.S. Cl.
    CPC .................................. B64D 11/003 (2013.01)
(58) Field of Classification Search
    CPC ......... B64D 11/003; B60R 5/003; B60R 7/04; B60R 7/08; B61D 37/003
See application file for complete search history.

(56) References Cited

U.S. PATENT DOCUMENTS

| | | | |
|---|---|---|---|
| 5,108,048 A * | 4/1992 | Chang .................. | B64D 11/003 244/118.1 |
| 5,413,292 A | 5/1995 | Luria | |
| 5,687,929 A * | 11/1997 | Hart ..................... | B64D 11/003 244/119 |
| 5,716,027 A * | 2/1998 | Hart ..................... | B64D 11/003 244/118.1 |

(Continued)

FOREIGN PATENT DOCUMENTS

| | | | | |
|---|---|---|---|---|
| DE | 20016405 U1 * | 2/2002 | ............ | B60R 5/003 |
| DE | 102019113929 A1 * | 11/2020 | | |

(Continued)

OTHER PUBLICATIONS

European Search Report for European Patent Application No. 22156038.6 dated Jul. 21, 2022; priority document.

*Primary Examiner* — Joshua J Michener
*Assistant Examiner* — Ryan Andrew Yankey
(74) *Attorney, Agent, or Firm* — Greer, Burns & Crain, Ltd.

(57) ABSTRACT

A compartment system for a vehicle cabin includes a framework assembly for attachment to a vehicle structure, and a container bin. The framework assembly includes a flat bottom section, a top part and a lateral stiffening element. The bottom section has a rear edge for attachment to the structure and a front edge opposite to the rear edge. The top part is spaced from and parallel to the bottom section front edge. The lateral stiffening element is connected to the top (Continued)

part and the bottom section to create the framework assembly having a front opening between the top part and the bottom section front edge. The container bin has a box-like shape and an open front side. The framework assembly and the container bin are configured to detachably attach the container bin in the framework assembly with the open front side arranged in the framework assembly front opening.

17 Claims, 3 Drawing Sheets

(56) References Cited

U.S. PATENT DOCUMENTS

| | | | | |
|---|---|---|---|---|
| 5,842,668 | A * | 12/1998 | Spencer | B64D 11/003 312/246 |
| 10,611,453 | B2 * | 4/2020 | Kauffman | B64C 1/061 |
| 11,136,124 | B2 | 10/2021 | Benthien | |
| 2009/0026318 | A1 * | 1/2009 | Gross | H02G 3/0431 244/129.1 |
| 2009/0294585 | A1 * | 12/2009 | Schmidt | B60R 7/02 296/24.3 |
| 2015/0122807 | A1 | 5/2015 | Van Loon | |
| 2018/0016010 | A1 | 1/2018 | Benthien et al. | |
| 2019/0367181 | A1 * | 12/2019 | Cysewski | B64D 47/02 |

FOREIGN PATENT DOCUMENTS

| | | |
|---|---|---|
| EP | 3075650 A1 | 10/2016 |
| NL | 2011754 C2 | 5/2015 |

\* cited by examiner

COMPARTMENT SYSTEM FOR A CABIN OF A VEHICLE

CROSS-REFERENCES TO RELATED APPLICATIONS

This application claims the benefit of the European patent application No. 22156038.6 filed on Feb. 10, 2022, the entire disclosures of which are incorporated herein by way of reference.

FIELD OF THE INVENTION

The invention relates to a compartment system for a cabin of a vehicle, a cabin of a vehicle as well as a vehicle having such a cabin and/or at least one such compartment system.

BACKGROUND OF THE INVENTION

There are various concepts for equipping aircraft cabins. Usually, cabins are equipped with a floor and paneling elements, as well as numerous other equipment components. These can include stowage compartments, service units for passengers, monuments, passenger seats and various electrical and electronic systems. Furthermore, air outlets and air ducts are provided and located in, adjacent to, behind, above or below equipment components. Conventional methods are based on the manual, sequential installation of all equipment components, which are manually carried into the cabin, positioned, and then assembled. More modern methods include placing pre-installed modules on a support that can be moved and lifted on the floor of the booth.

Usually, overhead stowage compartments comprise a dimensional stability and a sufficient rigidity to receive distinct loads during flight. They are supported by fittings attached to the outside surface of the stowage compartment and attached to the structure or to structural holders connected to the structure. Manufacturing this type of stowage compartment is usually conducted by using modern sandwich materials. However, these are hardly recyclable and may need to be replaced after facing wear and tear upon frequent use. Also, the replacement is cumbersome, as the stowage compartment is directly attached to the structure.

SUMMARY OF THE INVENTION

It is thus an object of the invention to propose a compartment system for a cabin of a vehicle, which allows a simple replacement and an improved recyclability.

A compartment system for a cabin of a vehicle is proposed, comprising: a framework assembly for attachment to a structure of the vehicle, and at least one container bin, wherein the framework assembly comprises a flat bottom section, at least one top part and at least one lateral stiffening element, wherein the bottom section has a rear edge for attachment to the structure and a front edge opposite to the rear edge, wherein the at least one top part is arranged in a distance and parallel to the front edge of the bottom section, wherein the at least one lateral stiffening element is connected to the at least one top part and the bottom section to create the framework assembly having at least one front opening between the at least one top part and the front edge of the bottom section, wherein the at least one container bin is a receptacle having a box-like shape and an open front side, and wherein the framework assembly and the at least one container bin are adapted to detachably attach the container bin in the framework assembly with the open front side arranged in the front opening of the framework assembly.

The compartment system is divided into two functional elements, i.e., the framework assembly and the container bin. The framework assembly is intended to be connected with the structure of the vehicle inside the cabin. The structure may include frames, stringers, and other structural elements that are part of the fuselage of the aircraft. The framework assembly may be connected to the structure through direct attachment, through holders or additional framework structures. The main task of the framework assembly is to provide a rigid base for container bins and various other installations. These may include passenger service units, electronic installations, holders for various electrical and fluid lines and so on.

The container bins may be designed with a rather simple shape and a clearly reduced rigidity, compared to common stowage compartments. For example, they may be of a cuboid shape having five substantially closed surfaces and one open surface, i.e., the open front side. According to the invention the framework assembly allows to receive and hold this type of container bin. Hence, instead of requiring sophisticated, rigid stowage compartments, the compartment system according to the invention allows to use simple container bins that are insertable and attachable to the framework assembly.

For providing the required task, the framework assembly comprises several parts that are assembled to form a three-dimensional framework, which is attachable to the structure of the vehicle. The main parts of the framework assembly are realized in the form of the bottom section, the top part, and the lateral stiffening element. For connecting these parts, various joints, fastening elements, brackets and other holders may be used.

The bottom section is intended for an installation to mainly extend in a horizontal direction. Its rear edge may be connected to an upper region of the fuselage structure or intermediate parts attached to the structure. Preferably, the rear edge of the bottom section is coupled with the structure and will be arranged at a lateral outer position of the cabin. The bottom section then extends from the fuselage structure in a horizontal direction and its front edge faces into the interior of the cabin. The rear edge is not necessarily a closed, linear edge, but may be considered a rearward delimitation. Here, a plurality of joints, a hinge or other components may be provided to connect it to the fuselage structure.

The bottom section may comprise a length, which may be the dimension of the bottom section that extends along the longitudinal direction of the vehicle in the installed state, that preferably exceeds a distance between two consecutive circumferential frames of the fuselage structure. However, bottom sections having a length of the rear edge that corresponds to the distance between two consecutive frames may also be considered. The front edge, which is arranged opposite to the rear edge and constitutes a forward delimitation of the bottom section, thus creates a lower edge of the front opening. The bottom section may comprise a width that is exceeded by the length. The width may be determined by the distance between the rear edge and the front edge and is mainly chosen depending on the design of the cabin and in particular of number and size of passenger seats below it in the installed state.

The bottom section may act as a shear panel. It may comprise a substantially flat lower panel, which is stiffened on the front, rear, and side edges, e.g., by attaching profiled parts onto the lower panel. In addition, a top panel may be arranged on top of the bottom section, such that a flat, box-like component is provided. The height of the bottom section is preferably clearly smaller than the length and width and may be chosen to receive passenger service units and the like.

The bottom section may at least partially made from a metal, e.g., above-mentioned profiled parts on the edges of the bottom section. However, also composite materials may be used in addition or as an alternative.

The top part, which may be realized as a beam, i.e., a longitudinal part having a profiled cross section for directional stability, is arranged in a distance and parallel to the front edge of the bottom section. Preferably, it will be placed vertically above the front edge of the bottom section in an installed state. Thus, it constitutes an upper delimitation of the front opening. Hence, the top part and the front edge of the bottom section together define the front opening, through which the container bin is placeable into the framework assembly. The top part and the front edge span a plane that is not necessarily but preferably perpendicular to the extension plane of the bottom section.

The top part will preferably be attached to a top part of the structure, e.g., by holders, rods, or other devices directly attached to the fuselage. To define a further improved dimensional rigidity of the framework assembly, the lateral stiffening elements are connected to both the bottom section and the top part. They may extend perpendicularly to a plane defined by the bottom section and thus define trays created in the framework assembly. It is conceivable that a plurality of lateral stiffening elements is provided, e.g., one lateral stiffening element per frame, such that a tray for preferably a single or, alternatively, a plurality of container bins is created.

The at least one container bin may be attached to the bottom section, the at least one top part and/or the lateral stiffening elements. For this, the at least one container bin may comprise bore holes, into which screws can be inserted that extend into the respective part of the framework assembly.

A main advantage of the compartment system according to the invention lies in providing the ability to simply replace container bins without requiring reaching structural holders. The container bins may be fixed to the framework assembly through fastening means, which are accessible from an interior space of the respective container bin. If required, different types of container bins may be installed. Individual container bins having a desired design, color or print may be easily installed after the final assembly of the vehicle. Furthermore, the container bin may be made from a material that allows a full recyclability.

In an advantageous embodiment, the container bin is designed as a one-piece shell. In particular, the at least one container bin is manufactured with a monolithic material, which improves the recyclability. Providing the container bin having a one-piece shell may decrease manufacturing costs and maintenance effort and may further improve handling and installation.

In an advantageous embodiment, the at least one container bin is made from a thermoplastic material. For instance, it may be made from PE, ABS, ASA, PMMA, PE, PP, PS, PC, PETG or PVC, or another common material. It may be manufactured by a thermoforming process, e.g., a deep drawing process. The container bin may be comparably soft, such that luggage and other material may slightly bend a bottom or side walls of the container bin. However, due to attaching the container bin to the framework assembly, this does not have a negative influence on the function of the compartment system.

In an advantageous embodiment, the at least one top part and the front edge span a front plane, wherein the front plane and the bottom section enclose an angle in a range of 60° to 120°, preferably in a range of 75° to 105° and most preferably of about 90°, "about" being +/−5°. Thus, the front opening of a compartment built by the compartment system may be in a plane perpendicular to the bottom section, i.e., in an x-z-plane of the vehicle in an installed state of the respective compartment. However, this angle may be dimensioned as required, e.g., if a certain height of the bottom section allows the front opening to reach into the interior space in a horizontal manner. Then, angles of more than 90° are possible.

In an advantageous embodiment, the at least one lateral stiffening element extends from the bottom section to the at least one top part. A lateral stiffening element may comprise a triangular or trapezoidal shape, wherein an edge attached to the bottom section may be longer than an upper edge connected to the respective top part.

In an advantageous embodiment, the at least one lateral stiffening element comprises a plurality of lateral stiffening elements, which pairwisely delimit individual insertion trays, which comprise a width and height that conform a width and height of a container bin. Thus, the insertion trays are able to receive a container bin each. The container bins may snugly fit to the lateral stiffening elements or they may define a small gap between the lateral stiffening elements and the bin. They may also be fixed to the lateral stiffening elements. By defining individual insertion trays, the attachment of the at least one container bin as well as a load transfer from the at least one container bin and the framework assembly is further improved.

In an advantageous embodiment, the compartment system further comprises at least one rear beam, wherein the at least one rear beam is arranged in the framework assembly to delimit an insertion depth for a container bin. The at least one rear beam protects installation equipment behind the container bin and allows a further introduction of loads from the container bin into the framework assembly. At least one rear beam may be arranged on top of or above the bottom section parallel to the rear edge, the front edge and/or the top part. The rear beam may also act as a structural part of the framework assembly.

In an advantageous embodiment, the container bin comprises removable divider plates, which divide an interior space of the container bin into separate trays. For example, the divider plates allow to provide individual trays inside a single container bin for the use by individual passengers. This will improve managing hand luggage on board an aircraft or another vehicle, which uses the compartment system according to the invention. The divider plates may simply slide into the at least one container bin, e.g., in suitable guides, and may simply be removed if not required.

In an advantageous embodiment, the bottom section is a load carrying PSU equipment panel. For example, the bottom section may comprise a plate-like structure with chamfered edges, onto which items of a passenger service unit (PSU) are installed. By providing a load carrying function it is not required to use another, separate bottom framework arrangement for additionally carrying a PSU channel Instead, the PSU channel is an integral part of the framework assembly. This simplifies the installation of PSU channels and the compartment system at the same time.

The invention further relates to a cabin of a vehicle, comprising a cabin floor, lateral walls and at least one compartment system according to the preceding description, wherein the bottom section of the at least one compartment system is arranged above the cabin floor at at least one of the lateral walls. The cabin may comprise at least one aisle and at least one passenger seat group arranged along the at least one aisle. The compartment system, i.e., compartments created by the compartment system, are preferably arranged above the cabin floor and above the at least one passenger seat group.

In an advantageous embodiment, the bottom section is arranged above the cabin floor, wherein the at least one top part is arranged above the bottom section. The front edge of the bottom section is arranged at a distance to the respective lateral wall of the cabin. It may also be advantageous to arrange the bottom section parallel to the cabin floor.

In an advantageous embodiment, the framework assembly extends along a longitudinal axis of the cabin and is adapted to receive a plurality of container bins. For example, the container bins allow to receive hand luggage of passengers.

In an advantageous embodiment, the framework assembly additionally comprises a receiving space for receiving at least one galley insert. Hence, galley functions or galley stowage space may be relocated from a galley into the compartment system above the cabin floor, which supports in providing smaller galleys inside the cabin. By the simple replaceability of the container bins it is easily possible to include a container bin that has integrated trays or dividers that are dimensioned to conform standard galley inserts. If not required, e.g., for short-haul flights, the respective container bin may be simply replaced.

The invention further relates to a vehicle, comprising a fuselage having a fuselage structure and a cabin of the above description integrated inside the fuselage structure.

In an advantageous embodiment, the vehicle is an aircraft. This may, e.g., be a commercial aircraft for transporting passengers.

BRIEF DESCRIPTION OF THE DRAWINGS

In the following, the attached drawings are used to illustrate exemplary embodiments in more detail. The illustrations are schematic and not to scale. Identical reference numerals refer to identical or similar elements. They show.

DETAILED DESCRIPTION OF THE PREFERRED EMBODIMENTS

Figure 1:
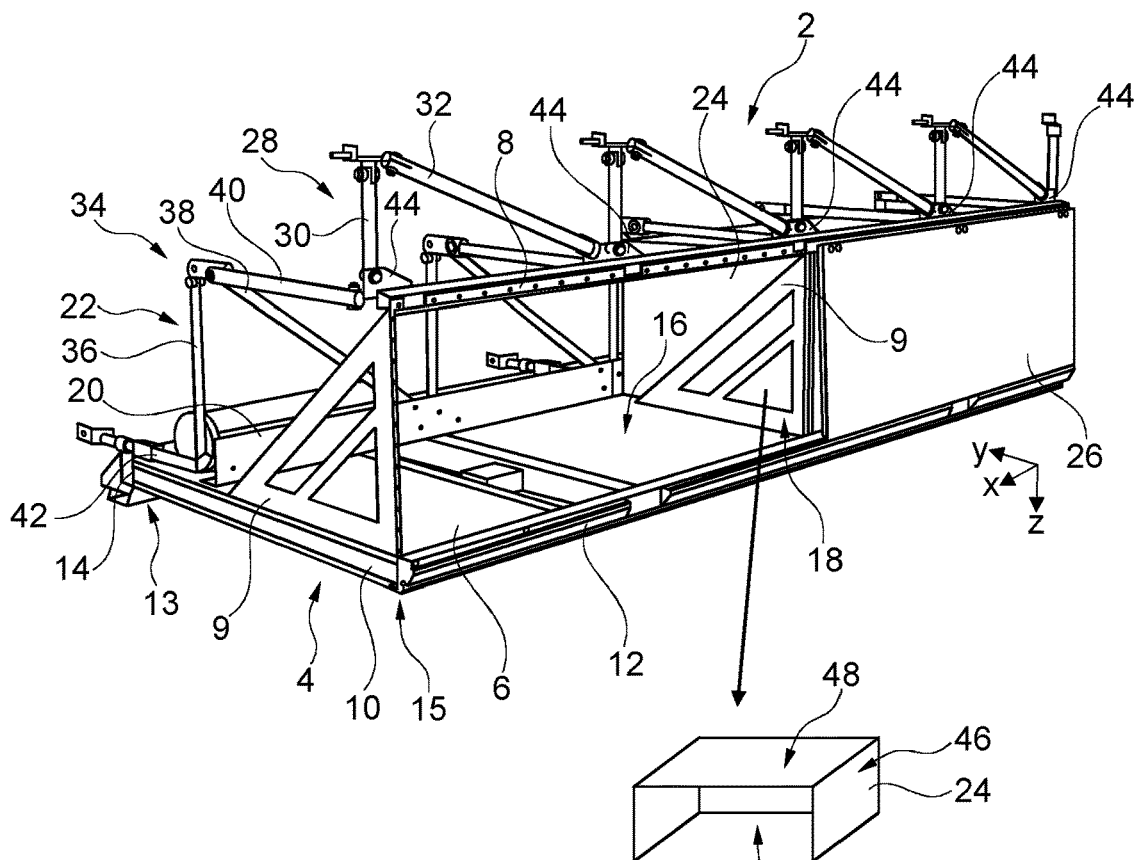
FIG. 1 shows a first perspective view of the compartment system attached to framework structures in a cabin.

FIG. 1 shows a compartment system 2 for a cabin of a vehicle. The compartment system 2 comprises a framework assembly 4 for attachment to a structure of the vehicle. The framework assembly 4 comprises flat bottom sections 6, top parts 8 in the form of beams, and lateral stiffening elements 9. The bottom sections 6 house a PSU channel and are designed as load carrying elements. In this example, the bottom sections 6 comprise a box-like structure having side profiles 10, front profiles 12 and rear profiles 14 as well as a top sheet 16. The bottom sections 6 have a front edge 15, a rear edge 13. They are intended to be arranged mainly horizontally inside the cabin of the aircraft. The height of the bottom sections 6, which is its extension in z direction, is clearly smaller than the length, which is its extension in x direction, and the width, which is its extension in y direction. The height should be chosen to provide a sufficient space to integrate passenger service units and associated installations.

The top beams 8 are arranged in a vertical distance and parallel to the bottom sections 6. The lateral stiffening elements 9 extend from the respective bottom section 6 to the respective top beam 8 and thereby define a front opening 18. At a horizontal distance to the front profile 12, a rear beam 20 is attached to the bottom section 6. Behind the rear beam 20, equipment installation 22 is arranged in a rear part of the bottom section 6.

A container bin 24 is insertable through the front opening 18 into the framework assembly 4. In doing so, a storage compartment for receiving hand luggage is created. Here, on the left-hand side of FIG. 1, a container bin 24 is left out for illustration purposes. On the right-hand side in FIG. 1, the container bin 24 is completely inserted and a lid 26 covers the container bin 24 and the front opening 18.

In this example, an upper framework structure 28 is provided to hold the top beams 8 on the fuselage structure. The upper framework structure 28 comprises vertical elements 30 and diagonal stiffening elements 32, which provide a required stability in the longitudinal (x) and vertical (z) direction of the cabin and are particularly adapted to absorb high loads in the longitudinal (x) direction. The top beams 8 are connected to the upper framework structure 28 through a plurality of joints 44.

Additionally, a lower framework structure 34 is provided for holding the bottom section 6 on the fuselage structure and comprises vertical elements 36 and diagonal elements 38. In addition, intermediate rods 40, which are arranged along the lateral (y) axis, extend from the lower framework structure 34 to the upper framework structure 28. Still further, lower horizontal rods 42 are attached to the bottom section 6, the lower framework structure 34 as well as the fuselage structure and extend along the y direction. Again, the lower framework structure 34 is attached to the bottom sections 6 through a plurality of joints, wherein a rear set of joints 44 is arranged along the rear edge 13 and a forward set of joints 44 is arranged between the rear edge 13 and the lateral stiffening elements 9, preferably directly at a lower end of the vertical elements 36.

It is conceivable, that the upper framework structure 28, the lower framework structure 34, the intermediate rods 40 and the lower horizontal rods 42 are integrated into the cabin before installation of the compartment system 2. The upper framework structure 28, the lower framework structure 34 and the joints 44 are preferably made from a metal. The bottom section 6 together with the lateral stiffening elements 9 and the attached top beams 8 may then be provided as a preassembled group of parts and is moved into the aircraft cabin on a rig to be attached to the lower horizontal rods 42 as well as several joints 44 of the upper framework structure 28 and the lower framework structure 34. Consequently, a three-dimensional framework structure holds the preassembled compartment system 2 in order to complete the assembly. Container bins 24 may be inserted through the front openings 18 afterwards. It is possible to easily replace the container bins 24 when desired, without requiring handling any part of the upper framework structure 28, the lower framework structure 34 or the vehicle structure directly.

Each connection between the upper framework structure 28 and the top beams 8, as well as each connection between the lower framework structure 34 and the bottom sections 6, preferably provide a statically fully determined support. Due to the large number of connection points to the framework structures 28 and 34, multiple load paths are created, which provide an exceptional redundance. Also, due to the design of the bottom sections 6, they act as a shear panel, i.e., a load distributing device, which evenly distributes mechanical loads into the connection points to the structure.

Figure 2:
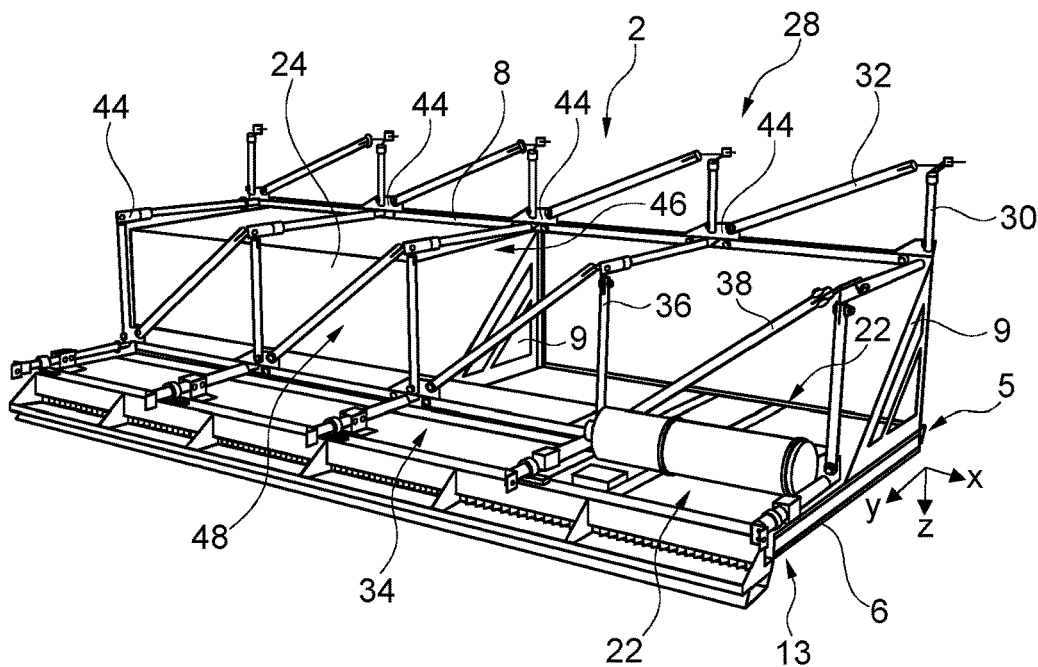
FIG. 2 shows a second perspective view of the compartment system attached to framework structures in a cabin.

In FIG. 2, the equipment installation 22 is schematically illustrated. Also, the container bin 24 is shown to comprise closed vertical sidewalls 46 and horizontal sidewalls 48. It may be made from a thermoplastic material, such as PE, ABS, ASA, PMMA, PE, PP, PS, PC, PETG or PVC. It does not need to be as rigid as common overhead stowage compartments, as the framework assembly 4 transfers the mechanical loads that arise when using the respective compartment into the fuselage structure. It may comprise a color design adapted to the operator of the vehicle. It may also comprise a print inside it, either as information or for advertisement. Furthermore, the container bin 24 may comprise recesses or protrusions on two opposed horizontal sidewalls 48 to receive divider panels for separating a plurality of trays inside the container bin 24.

Figure 3:
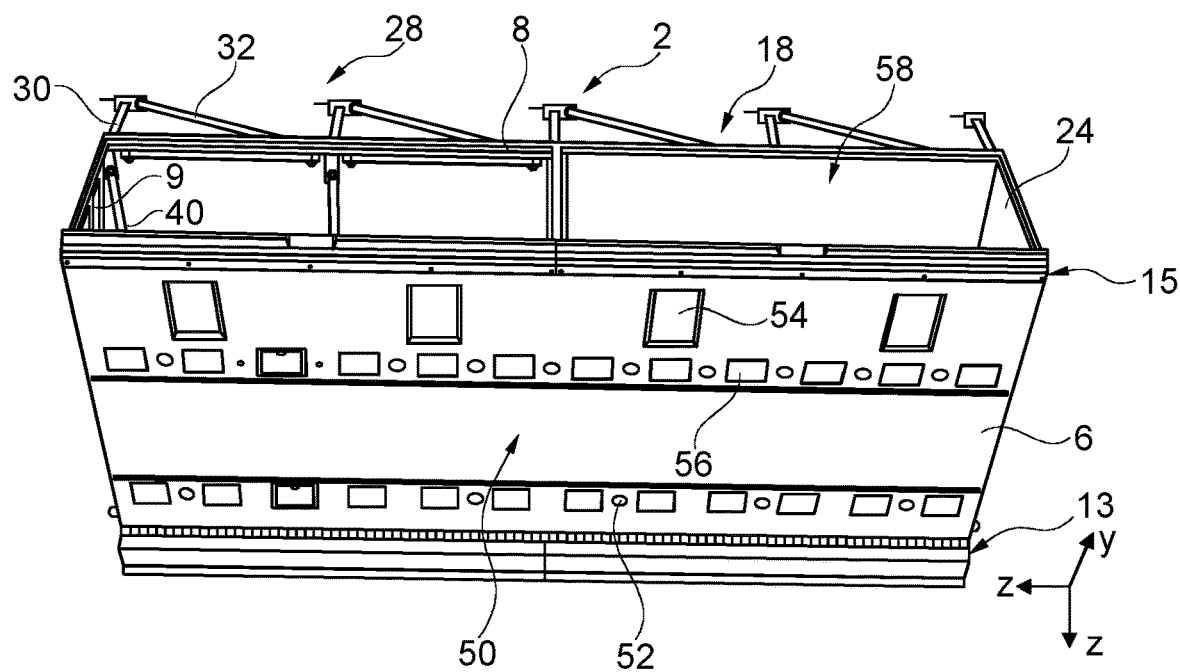
FIG. 3 shows a third perspective view of the compartment system attached to framework structures in a cabin.

In FIG. 3 an open front side 58 of the container bin 24 is shown, which serves for receiving hand luggage. The viewing perspective in FIG. 3 shows an underside 50 of the bottom section 6. It is apparent that the bottom section 6 acts as a passenger service unit (PSU) with reading lights 52, announcement speakers 54 and individual notification signs 56. Hence, the bottom section 6 integrates two main functions in the form of a load carrying element and passenger service units.

Figure 4:
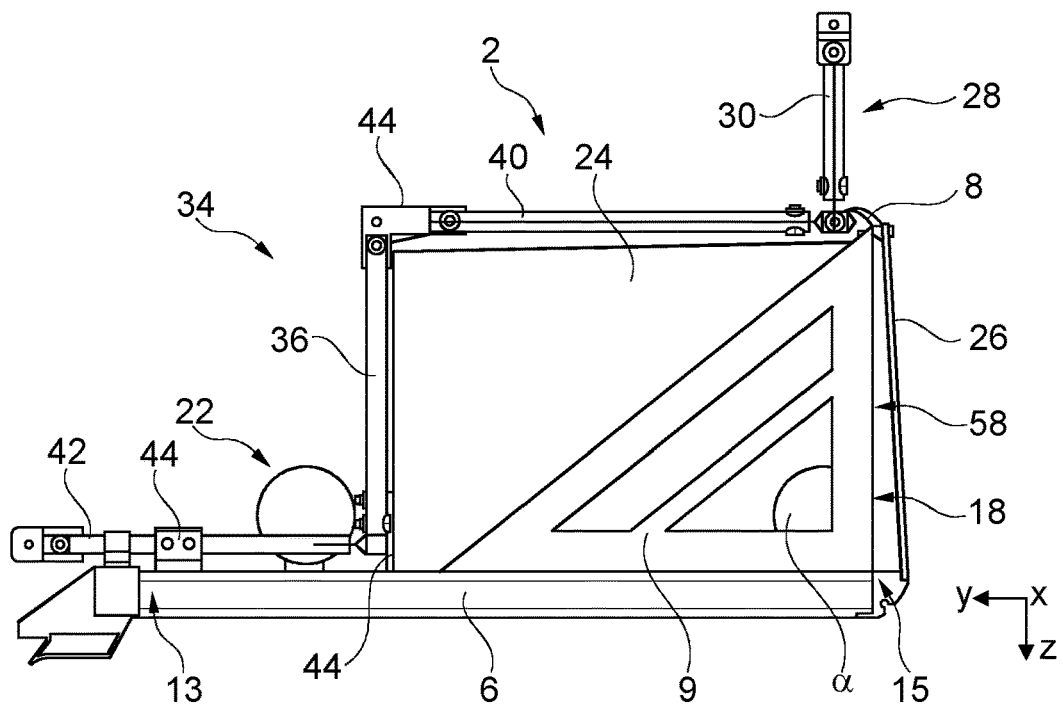
FIG. 4 shows a side view on the compartment system attached to framework structures in a cabin.

In FIG. 4, the compartment system 2 in a lateral view is shown. Here, an angle $\alpha$ between the bottom section 6 and a plane created by the top beam 8 and the front edge 15 is shown to be substantially 90°. Hence, the front opening 18 and the open front side 58 of the container bin 24 are substantially perpendicular to the bottom section 6.

The upper framework structure 28 is designed to compensate manufacturing induced tolerances to exactly place the top beams 8 in a desired spatial orientation, i.e., parallel to the longitudinal axis x of the fuselage structure 60. The vertical elements 30 and the diagonal stiffening elements 32 may thus be attached to the structure 60 through adjustable holders (not shown) and/or they may be adjustable in length.

Further, the lower framework structure 34 is preferably designed to compensate manufacturing induced tolerances for holding the rear edge 13 of the bottom section 6 in a desired spatial orientation, i.e., parallel to the longitudinal axis of the fuselage structure 60, too. The lower horizontal rods 42 may thus be attached to the structure 60 through adjustable holders (not shown).

Figure 5:
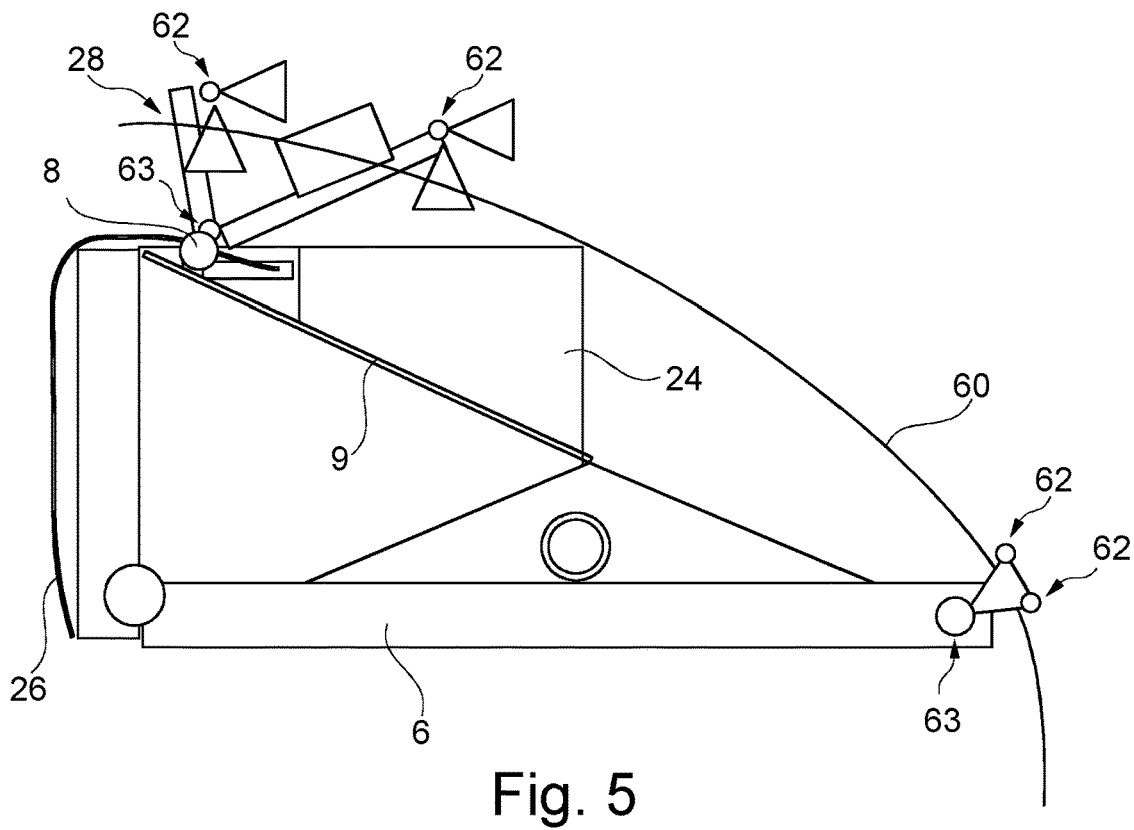
FIG. 5 shows a schematic side view of the compartment system attached to framework structures in a cabin.

FIG. 5 demonstrates a simplified arrangement of the bottom section 6 on a fuselage structure 60. Here, the bottom section 6 is coupled with the structure 60 through at least one fastening tube 63, which extends parallel to the longitudinal axis x of the fuselage structure 60 and which is attached to the fuselage structure 60 through structural holders 62. The connection between the at least one fastening tube 63 and the structural holders 62 is adjustable to compensate manufacturing induced tolerances. When mounting the at least one fastening tube 63 inside the fuselage structure 60, it may be adjusted along a datum line to exactly extend along a longitudinal direction. In this example, the bottom section 6 is coupled with the at least one fastening tube 63 directly and will thus be placed exactly along the above-mentioned datum line. The at least one fastening tube 63 furthermore acts as a load distribution device.

The top beam 8 is coupled with the fuselage structure 60 through the upper framework structure 28 and the intermediate rods 40, which are directly attached to at least one further fastening tube 63, which in turn is connected to the structure 60 through structural holders 62.

Figure 6:
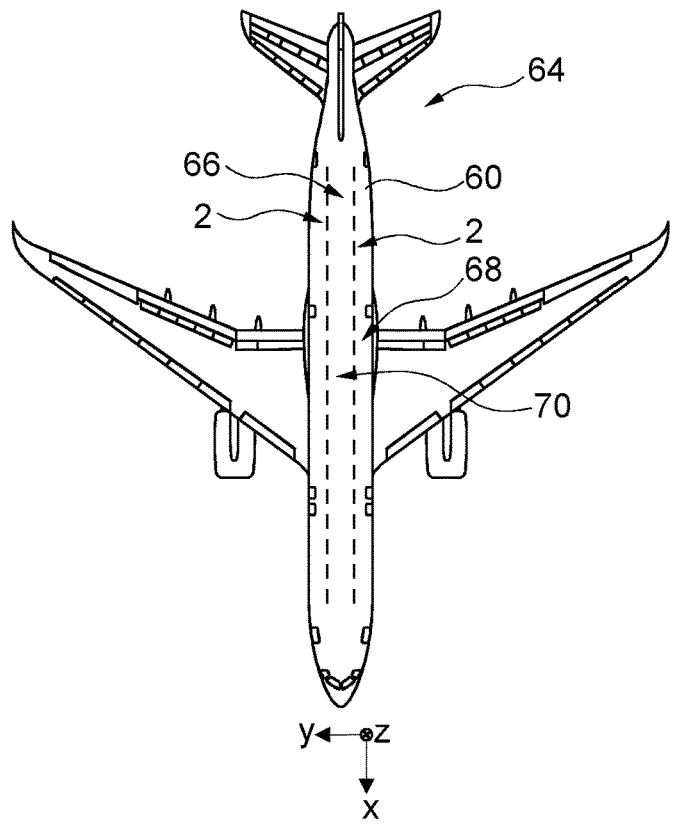
FIG. 6 shows an aircraft having a cabin with a compartment system arranged therein.

Finally, FIG. 6 shows an aircraft 64 having a fuselage structure 60, into which a cabin 66 is integrated, which comprises the compartment system 2. Exemplarily, the compartment system 2 extends along a substantial length of the cabin 66. The cabin 66 comprises a cabin floor 70 and lateral walls 68, wherein the compartment system 2 is arranged above the cabin floor 70 at the respective lateral walls 68.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 compartment system
4 framework assembly
6 bottom section
8 top part/beam
9 lateral stiffening element
10 side profile
12 front profile
13 rear edge
14 rear profile
15 front edge
16 top sheet
18 front opening
20 rear beam
22 equipment installation
24 container bin
26 lid
28 upper framework structure
30 vertical element
32 diagonal stiffening element
34 lower framework structure
36 vertical element
38 diagonal element
40 intermediate rod
42 lower horizontal rod
44 joint
46 vertical sidewall
48 horizontal sidewall
50 underside 52 reading light
54 announcement speaker
56 notification sign
58 front side
60 fuselage structure
62 structural holder
63 fastening tube
64 aircraft
66 cabin
68 lateral wall
70 cabin floor
α angle

The invention claimed is:

1. A compartment system for receiving hand luggage in a cabin of a vehicle, comprising:
   a framework assemblyfor attachment to a structure of the vehicle, and
   at least one container bin,
   wherein the framework assembly comprises a flat bottom section, at least one top part and at least one lateral stiffening element,
   wherein the bottom section has a rear edge for attachment to the structure and a front edge opposite to the rear edge,
   wherein the at least one top part is arranged in a distance and parallel to the front edge of the bottom section,
   wherein the at least one lateral stiffening element is connected to the at least one top part and the bottom section to create the framework assembly having at least one front opening between the at least one top part and the front edge of the bottom section,
   wherein the at least one container bin is a receptacle having an open front side, configured as a one-piece shell from a thermoplastic material,
   wherein the framework assembly and the at least one container bin are adapted to detachably attach the container bin in the framework assembly to the at least one lateral stiffening element, and
   wherein the bottom section is a load carrying passenger service unit equipment panel such that the at least one container bin is disposed upon the bottom section.

2. The compartment system of claim 1, wherein the at least one top part and the front edge span a front plane, and wherein the front plane and the bottom section enclose an angle in a range of 60° to 120°.

3. The compartment system of claim 2, wherein the angle is in a range of 75° to 105°.

4. The compartment system of claim 3, wherein the angle is about 90°.

5. The compartment system of claim 1, wherein the at least one lateral stiffening element extends from the bottom section to the at least one top part.

6. The compartment system of claim 1, wherein the at least one lateral stiffening element comprises a plurality of lateral stiffening elements, which pairwisely delimit individual insertion trays, which comprise a width and height that conform a width and height of a container bin.

7. The compartment system of claim 1,
   further comprising at least one rear beam,
   wherein the at least one rear beam is arranged in the framework assembly to delimit an insertion depth for a container bin.

8. The compartment system of claim 1, wherein the container bin comprises removable divider plates, which divide an interior space of the container bin into separate trays.

9. A cabin of a vehicle, comprising a cabin floor, lateral walls and at least one compartment system, according to claim 1,
   wherein the bottom section of the at least one compartment system is arranged above the cabin floor at at least one of the lateral walls.

10. The cabin of claim 9,
    wherein the bottom section is arranged above the cabin floor, and
    wherein the at least one top part is arranged above the bottom section.

11. The cabin of claim 9, wherein the framework assembly extends along a longitudinal axis of the cabin and is configured to receive a plurality of container bins.

12. The cabin of claim 11, wherein the framework assembly additionally comprises a receiving space for receiving at least one galley insert.

13. A vehicle, comprising
    a fuselage having a fuselage structure, and
    a cabin of claim 9 integrated inside the fuselage structure.

14. The vehicle according to claim 13, wherein the vehicle is an aircraft.

15. The compartment system of claim 1, wherein the at least one container bin is a cuboid.

16. The compartment system of claim 1, wherein the bottom section has side profiles, front profiles, rear profiles, and a top sheet, such that the at least one container bin is disposed upon the top sheet.

17. The compartment system of claim 1, wherein the at least one lateral stiffening element has a triangular or trapezoidal shape, wherein an edge of the at least one lateral stiffening element attached to the bottom section is longer than an upper edge connected to the at least one top part.

* * * * *